Figure 1:
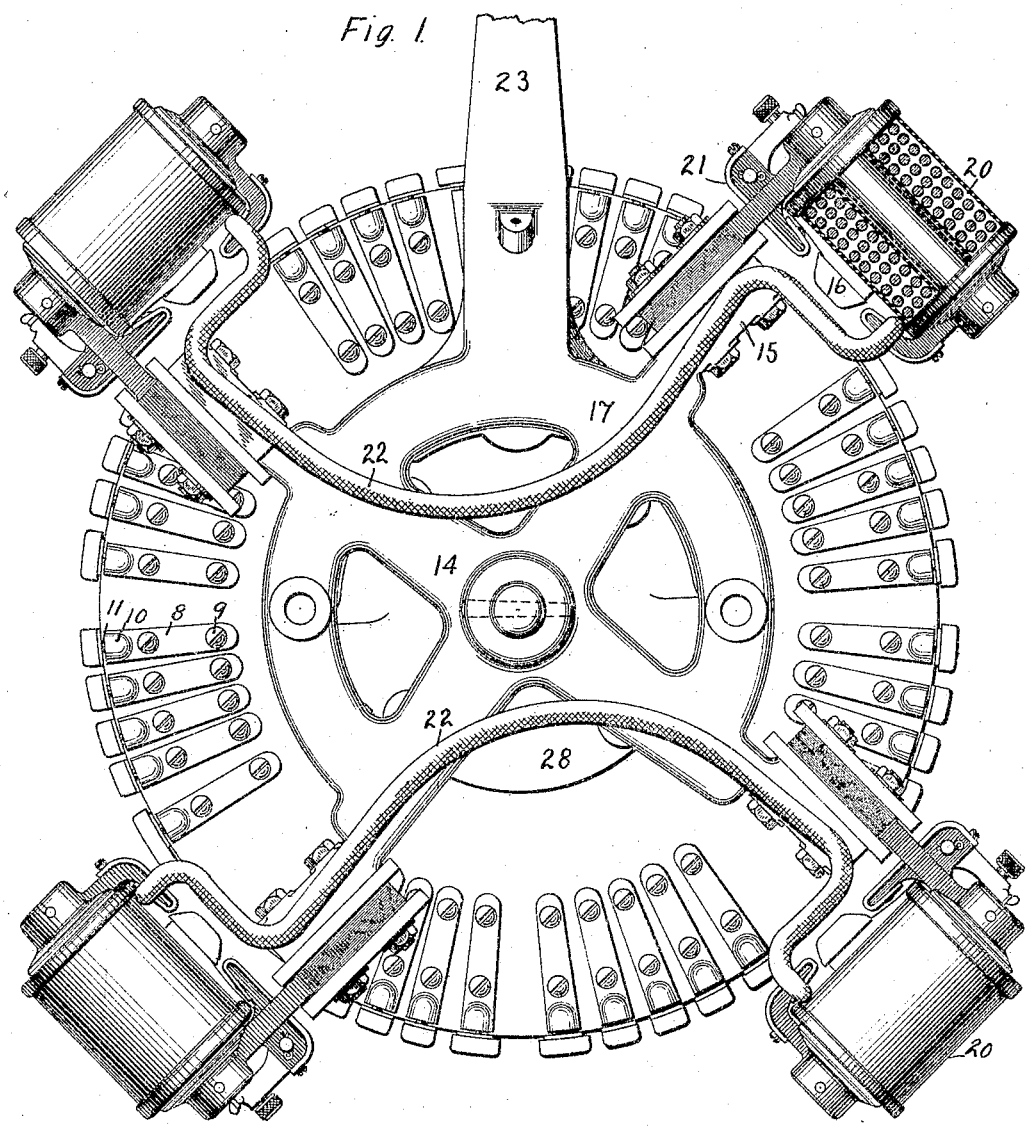

No. 774,800. PATENTED NOV. 15, 1904.
H. L. VAN VALKENBURG.
CONTROLLER FOR ELECTRIC MOTORS.
APPLICATION FILED APR. 14, 1904.
NO MODEL. 2 SHEETS—SHEET 1.

No. 774,800. PATENTED NOV. 15, 1904.
H. L. VAN VALKENBURG.
CONTROLLER FOR ELECTRIC MOTORS.
APPLICATION FILED APR. 14, 1904.
NO MODEL. 2 SHEETS—SHEET 2.
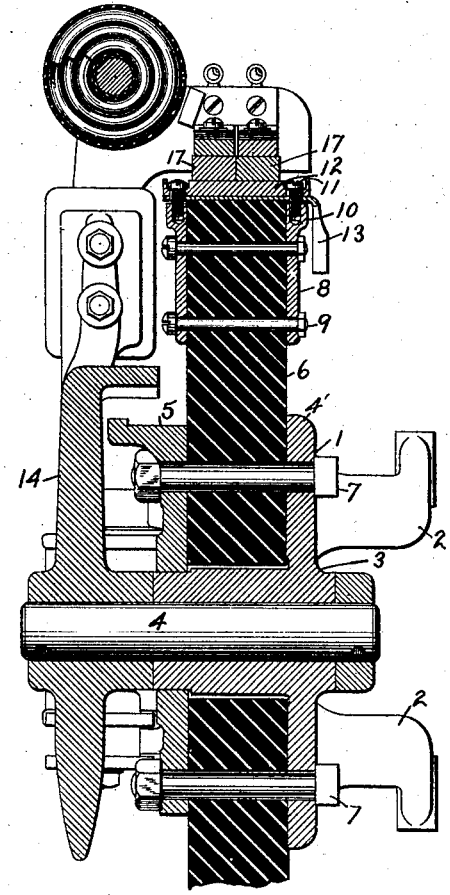
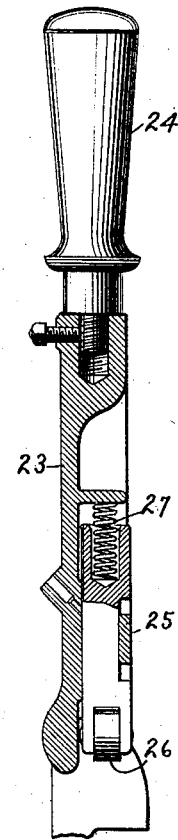
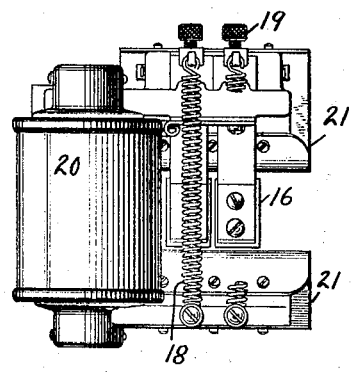
WITNESSES:
C. L. Belcher
Fred H. Miller
INVENTOR
Hermon L. Van Valkenburg
BY
ATTORNEY.

No. 774,800. Patented November 15, 1904.

UNITED STATES PATENT OFFICE.

HERMON L. VAN VALKENBURG, OF PITTSBURG, PENNSYLVANIA, ASSIGNOR TO WESTINGHOUSE ELECTRIC & MANUFACTURING COMPANY, A CORPORATION OF PENNSYLVANIA.

CONTROLLER FOR ELECTRIC MOTORS.

SPECIFICATION forming part of Letters Patent No. 774,800, dated November 15, 1904.

Application filed April 14, 1904. Serial No. 203,227. (No model.)

*To all whom it may concern:*

Be it known that I, HERMON L. VAN VALKENBURG, a citizen of the United States, and a resident of Pittsburg, in the county of Allegheny and State of Pennsylvania, have invented a new and useful Improvement in Controllers for Electric Motors, of which the following is a specification.

My invention relates to controllers for electric motors, and particularly to apparatus of this character which is employed for the control of motors which are started, stopped, and reversed at frequent intervals, and the speed of which is varied by varying the amount of external resistance included in circuit therewith.

The object of my invention is to provide a controller of simple, compact, and durable construction which shall perform the service for which it is intended without danger of interruption of such service and without liability of injury to the controller itself or to the motors controlled thereby.

My invention is an improvement upon the controller shown, described, and claimed in Patent No. 574,885, granted to the Westinghouse Electric & Manufacturing Company, January 12, 1897, as assignee of Harry P. Davis, and reference may be had to that patent for a detailed description of any features of construction which are here shown and not specifically described.

The controller which embodies my present invention is primarily intended for use in controlling the operation of electric motors that are employed for driving cranes or elevators, although not necessarily restricted to such use. As is well known, motors for such service are necessarily started, stopped, and reversed at frequent intervals and are operated at varying speeds. Such service obviously requires the use of a controller which may perform such exacting service with certainty and with a minimum danger of breaking down or of injury to its several parts.

A controller which will satisfactorily perform the service indicated must necessarily have a more or less complicated structure, and therefore be more expensive than one which is called upon to perform a less varied service, and therefore any simplifications and consequent cheapening of the structure without impairing its efficiency is of very material importance.

In the accompanying drawings, Figure 1 is a front elevation of a controller constructed in accordance with my invention, a portion of the operating-handle or operating-arm being broken away. Fig. 2 is a central section through a portion of the controller. Fig. 3 is a detail view of one of the movable contact members and its blow-out magnet; and Fig. 4 is a longitudinal section through a portion of the operating-arm of the movable member of the controller, the handle being shown in elevation.

The supporting-frame of the controller comprises a casting 1, having a plurality of legs 2, which may be suitably fastened to either a vertical, a horizontal, or an inclined framework, but which in ordinary use will be attached to a vertical framework, and having also a central tubular bearing portion 3 for the shaft 4 of the movable member of the controller, which will be hereinafter described.

Between the plate or disk portion 4 of the support and another disk portion 5, which fits over the outer end of the tubular portion 3, is clamped a disk 6, of marble, slate, composition, or other suitable non-conducting material, by means of bolts 7. Radially disposed upon both faces of the disk 6 in eight groups and adjacent to its edge are conducting-strips 8 which correspond in arrangement and function to the annularly-arranged conducting-blocks of the Davis patent hereinbefore referred to. These conducting-strips are clamped to the faces of the disk 6 and to each other in pairs by means of bolts 9, the disk serving alone not only as a support for these conducting-strips, but also as an insulator, whereby each pair of connected strips is suitably insulated from every other pair. The outer ends of the strips 8 are enlarged and tapped, as indicated at 10, to receive screws 11. Fastened to the ends of the strips 8 by means of the screws 11 are contact-bars 12, of copper or other suitable conducting material, these bars having countersunk holes in their ends to receive the screws 11. Clamped between the bars 12, the ends of the strips 8, and the edge of the disk 6 are terminal strips 13, by means of which connections are made to the resistance elements, which may be the same as those shown in the hereinbefore-mentioned Davis patent or of any other suitable construction and the effective lengths of which are varied by the operation of the controller.

Mounted upon the shaft 4 is a spider 14, having four arms 15, which at their outer ends are severally provided with two contact-shoes 16, these shoes being pivotally mounted in a suitable frame 17 and being spring-pressed against the contact-bars 12 by means of coil-springs 18, the pressure exerted by these springs being adjusted by means of thumb-nuts 19. Mounted in the frame 17 and suitably connected in circuit is a blow-out magnet-coil 20, the pole-pieces 21 of which terminate adjacent to the contact-shoes 16, as indicated in Fig. 1 and substantially as shown shown and described in the above-mentioned Davis patent. The contact-shoes and blow-out coils pertaining to the several spider-arms are connected in pairs by means of cables 22.

The spider 14 is provided with an operating-arm 23, having at its outer end a handle 24 and having also a slotted bar or block 25, provided at its inner end with a roller 26 and normally forced upwardly by means of a spring 27, the roller 26 being intended and adapted to engage notches in a suitable plate 28 in order to indicate to the operator the off position and the maximum-speed positions of the movable member of the controller.

As already stated, the general structure, mode of operation, and result are substantially the same as those set forth in the Davis patent hereinbefore specified; but the structural details which are here set forth are of greatly simplified and improved character and render the apparatus as a whole more satisfactory and desirable in practical service.

While I have described my invention as applicable only for the purpose of varying the amount of resistance in the circuits of direct-current motors or other apparatus, it is possible to so modify the structure of the controller that it may be employed to vary the active lengths of transformer or other windings which are adapted to be energized by alternating currents and which may be employed for varying the voltage delivered to induction-motors or similar apparatus.

I claim as my invention—

1. In a controller for electric motors, the combination with a stationary member comprising a supporting-stand and a disk of non-conducting material having sets of radial conducting-strips bolted to both sides thereof adjacent to its edge and contact-bars removably fastened to said strips of a movable member pivoted to the supporting-stand and comprising a plurality of arms having contact-shoes at their outer ends.

2. In a controller for electric motors, a stationary member comprising a non-conducting disk, radial strips bolted together in pairs against opposite faces of the disk adjacent to its edge and contact-bars removably fastened to the outer ends of said pairs of strips.

3. In a controller for electric motors, the combination with a pivoted member having four arms each of which is provided at its outer end with contact-shoes and a blow-out magnet, of a stationary member comprising a supporting-frame, and a disk of non-conducting material having radial conducting-strips bolted together against its opposite faces in pairs, contact-bars removably fastened to the ends of said pairs of strips and terminal strips clamped between said bars and said radial strips.

4. A controller for electric motors having a stationary member comprising a non-conducting disk having radial conducting-strips removably fastened thereto and contact-bars removably fastened to the ends of said strips.

5. A controller for electric motors having a stationary member comprising a non-conducting disk having radial conducting-strips removably fastened thereto around the edge thereof, contact-bars removably fastened to the ends of said strips and terminal strips clamped between the contact-bars and the radial strips.

6. A controller for electric motors having a stationary member comprising a non-conducting disk and a plurality of circumferentially-disposed contact-terminals which embrace the edge of the disk and are insulated from each other and are supported solely by the disk.

7. A controller for electric motors having a stationary member comprising a non-conducting disk and a plurality of circumferentially-disposed contact-terminals which are insulated from each other by it and which embrace its edge and the contact portions of which are independently removable.

8. A controller for electric motors having a stationary member comprising a non-conducting disk and a plurality of circumferentially-disposed contact-terminals each of which comprises two strips bolted together against opposite faces of the disk and a contact-piece removably fastened to the ends of said strips.

In testimony whereof I have hereunto subscribed my name this 11th day of April, 1904.

HERMON L. VAN VALKENBURG.

Witnesses:
Jos. W. Alexander,
Birney Hines.